United States Patent
Merlin et al.

(10) Patent No.: US 10,660,089 B2
(45) Date of Patent: May 19, 2020

(54) PROTECTION FOR MULTI-USER TRANSMISSIONS

(71) Applicant: QUALCOMM Incorporated, San Diego, CA (US)

(72) Inventors: Simone Merlin, San Diego, CA (US); Gwendolyn Denise Barriac, Encinitas, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/625,247

(22) Filed: Jun. 16, 2017

(65) Prior Publication Data

US 2017/0290061 A1 Oct. 5, 2017

Related U.S. Application Data

(62) Division of application No. 14/742,574, filed on Jun. 17, 2015.

(Continued)

(51) Int. Cl.
*H04W 74/08* (2009.01)
*H04W 72/04* (2009.01)
(Continued)

(52) U.S. Cl.
CPC ...... *H04W 72/0446* (2013.01); *H04B 7/0452* (2013.01); *H04W 74/002* (2013.01);
(Continued)

(58) Field of Classification Search
None
See application file for complete search history.

(56) References Cited

U.S. PATENT DOCUMENTS 8,665,906 B1 3/2014 Liu et al.
8,989,066 B2 3/2015 Merlin et al.
(Continued)

FOREIGN PATENT DOCUMENTS

CN 102237920 A 11/2011
CN 103813373 A 5/2014
(Continued)

OTHER PUBLICATIONS

IEEE Std 802.11-2012 (Revision of IEEE Std 802.11-2007), IEEE Standard for Information technology—Telecommunications and information exchange between systems Local and metropolitan area network—Specific requirements Part 11: Wireless LAN Medium Access Control (MAC) and Physical Layer (PHY) Specifications, Mar. 29, 2012, 2793 pages.
(Continued)

*Primary Examiner* — Jason E Mattis
*Assistant Examiner* — Hong Shao
(74) *Attorney, Agent, or Firm* — Patterson & Sheridan, LLP

(57) ABSTRACT

Aspects of the present disclosure provide various mechanisms for protection of MU transmissions, such as UL MU MIMO and UL OFDMA. The mechanisms may allow for various NAV setting options for UL MU MIMO or UL OFDMA. Aspects of the present invention relate to a processing system configured to generate a first frame configured to trigger multiple transmissions from multiple devices, wherein the first frame has a duration field set to a value corresponding to a duration that covers at least the multiple transmissions, and an interface configured to output the frame for transmission.

20 Claims, 9 Drawing Sheets

Related U.S. Application Data

(60) Provisional application No. 62/014,104, filed on Jun. 18, 2014.

(51) Int. Cl.
  *H04B 7/0452* (2017.01)
  *H04W 74/00* (2009.01)
  *H04W 28/26* (2009.01)
  *H04W 84/12* (2009.01)

(52) U.S. Cl.
  CPC ........ *H04W 74/0816* (2013.01); *H04W 28/26* (2013.01); *H04W 84/12* (2013.01)

(56) References Cited

U.S. PATENT DOCUMENTS

| | | | |
|---|---|---|---|
| 9,655,144 | B2 | 5/2017 | Seok et al. |
| 9,681,418 | B2 | 6/2017 | Ramamurthy et al. |
| 2011/0150004 | A1 | 6/2011 | Denteneer et al. |
| 2011/0268054 | A1 | 11/2011 | Abraham et al. |
| 2011/0268094 | A1* | 11/2011 | Gong ............... H04L 1/1685 370/338 |
| 2012/0008599 | A1* | 1/2012 | Marin .............. H04W 74/006 370/336 |
| 2012/0060075 | A1* | 3/2012 | Gong ............... H04L 1/0025 714/776 |
| 2012/0069828 | A1 | 3/2012 | Taki et al. |
| 2012/0263091 | A1* | 10/2012 | Kim ................. H04B 7/0452 370/312 |
| 2012/0314697 | A1 | 12/2012 | Noh et al. |
| 2013/0294394 | A1* | 11/2013 | Kneckt ............ H04W 74/0816 370/329 |
| 2014/0126509 | A1 | 5/2014 | You et al. |
| 2014/0269544 | A1 | 9/2014 | Zhu et al. |
| 2015/0071204 | A1* | 3/2015 | Seok ................ H04B 7/0452 370/329 |
| 2015/0359000 | A1 | 12/2015 | Li et al. |
| 2015/0365940 | A1 | 12/2015 | Chu et al. |
| 2015/0373702 | A1 | 12/2015 | Merlin |
| 2017/0070906 | A1 | 3/2017 | Luo et al. |
| 2017/0127451 | A1* | 5/2017 | Chun ................ H04W 84/12 |

FOREIGN PATENT DOCUMENTS

| | | |
|---|---|---|
| JP | 2013526153 A | 6/2013 |
| WO | 2011123631 A1 | 10/2011 |
| WO | 2011130344 A1 | 10/2011 |

OTHER PUBLICATIONS

International Search Report and Written Opinion—PCT/US2015/036368—ISA/EPO—dated Oct. 2, 2015.

Nguyen T T., et al., "Submission doc.: IEEE 11-14/0598r0 Uplink multi-user MAC protocol for 11ax", XP055211882, May 10, 2014, 19 Pages. Retrieved from the Internet: URL:https://mentor.ieee.org/802.11/dcn/14/11-14-0598-00-00ax-uplink-multi-user-mac-protocol-for-11ax.pptx [retrieved on Sep. 8, 2015].

* cited by examiner

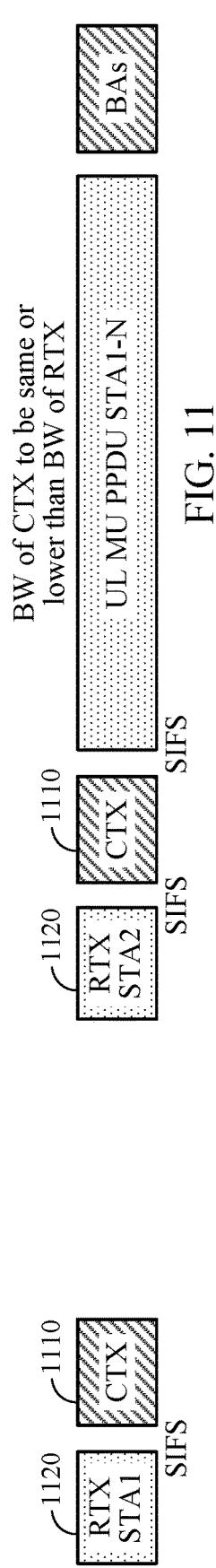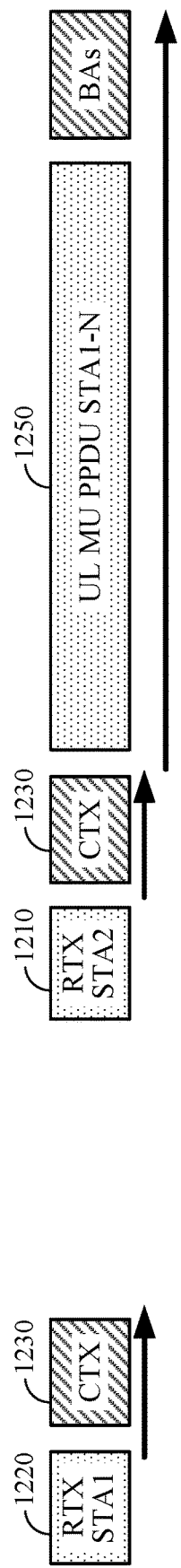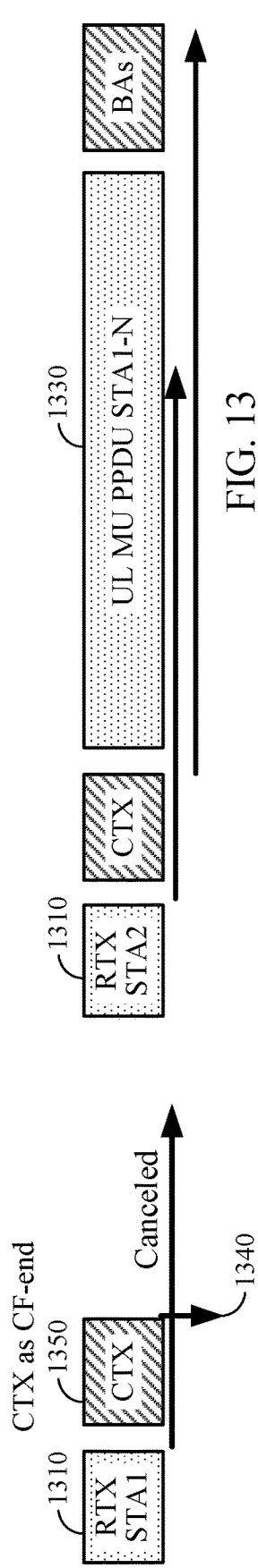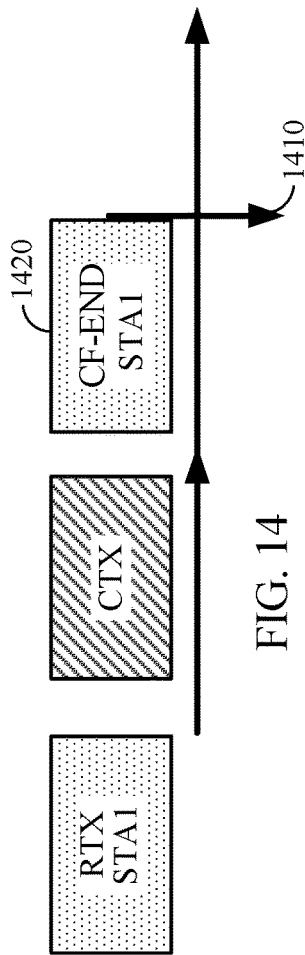
FIG. 11
FIG. 12
FIG. 13
FIG. 14

PROTECTION FOR MULTI-USER TRANSMISSIONS

CLAIM OF PRIORITY UNDER 35 U.S.C. § 119

This application is a divisional application of U.S. patent application Ser. No. 14/742,574 entitled "PROTECTION FOR MULTI-USER TRANSMISSIONS", filed Jun. 17, 2015, which claims benefit of U.S. Provisional Patent Application Ser. No. 62/014,104, filed Jun. 18, 2014, both of which are herein incorporated by reference in their entireties.

BACKGROUND

Field of the Invention

Certain aspects of the present disclosure generally relate to multi-user transmissions, such as (MU) Multiple Input Multiple Output (MIMO) and Orthogonal Frequency Division Multiple Access (OFDMA) transmissions. More specifically, aspects of the present invention relate to a processing system configured to generate a first frame configured to trigger multiple transmissions from multiple devices, wherein the first frame has a duration field set to a value corresponding to a duration that covers at least the multiple transmissions, and an interface configured to output the frame for transmission.

Relevant Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth requirements that are demanded for wireless communications systems, different schemes are being developed to allow multiple user terminals to communicate with a single access point by sharing the channel resources while achieving high data throughputs. Multiple Input Multiple Output (MIMO) technology represents one such approach that has emerged as a popular technique for communication systems. MIMO technology has been adopted in several wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

SUMMARY

Certain aspects of the present disclosure generally relate to protection for multi-user transmissions, such as uplink (UL) MU MIMO and OFDMA transmissions.

Certain aspects of the present disclosure provide an apparatus for wireless communications. The apparatus generally includes a processing system configured to generate a first frame configured to trigger multiple transmissions from multiple devices, wherein the first frame has a duration field set to a value corresponding to a duration that covers at least the multiple transmissions and an interface configured to output the frame for transmission.

Certain aspects of the present disclosure provide an apparatus for wireless communications. The apparatus generally includes a processing system configured to generate a first frame configured to trigger a first wireless device to send a second frame configured to trigger multiple transmissions from multiple second wireless devices including the apparatus, wherein the first frame has a duration field set to a value corresponding to a duration that covers at least the second frame and an interface configured to output the frame for transmission.

Certain aspects of the present disclosure provide a method for wireless communications by an apparatus, comprising, generating a first frame configured to trigger multiple transmissions from multiple devices, wherein the first frame has a duration field set to a value corresponding to a duration that covers at least the multiple transmissions, and outputting the frame for transmission.

Certain aspects of the present disclosure provide a method for wireless communications by an apparatus comprising, generating a first frame configured to trigger a first wireless device to send a second frame configured to trigger multiple transmissions from multiple second wireless devices including the apparatus, wherein the first frame has a duration field set to a value corresponding to a duration that covers at least the second frame, and outputting the frame for transmission Certain aspects of the present disclosure provide an apparatus for wireless communications by an apparatus comprising, means for generating a first frame configured to trigger multiple transmissions from multiple devices, wherein the first frame has a duration field set to a value corresponding to a duration that covers at least the multiple transmissions, and means for outputting the frame for transmission.

Certain aspects of the present disclosure provide an apparatus for wireless communications by an apparatus, comprising, means for generating a first frame configured to trigger a first wireless device to send a second frame configured to trigger multiple transmissions from multiple second wireless devices including the apparatus, wherein the first frame has a duration field set to a value corresponding to a duration that covers at least the second frame, and means for outputting the frame for transmission.

Certain aspects of the present disclosure provide for an access point comprising at least one antenna, a processing system configured to generate a first frame configured to trigger multiple transmissions from multiple devices, wherein the first frame has a duration field set to a value corresponding to a duration that covers at least the multiple transmissions, and a transmitter configured to transmit the frame via the at least one antenna.

Certain aspects of the present disclosure provide for a wireless station comprising at least one antenna, a processing system configured to generate a first frame configured to trigger a first wireless device to send a second frame configured to trigger multiple transmissions from multiple second wireless devices including the apparatus, wherein the first frame has a duration field set to a value corresponding to a duration that covers at least the second frame, and a transmitter configured to transmit the frame via the at least one antenna.

Various aspects also provide methods, apparatuses, and computer-readable mediums having instructions stored thereon for performing the various operations described herein.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIGS. 4-17 illustrate timing diagrams showing various aspects of the present disclosure for protecting multi-user transmissions.

DETAILED DESCRIPTION

Figure 1:
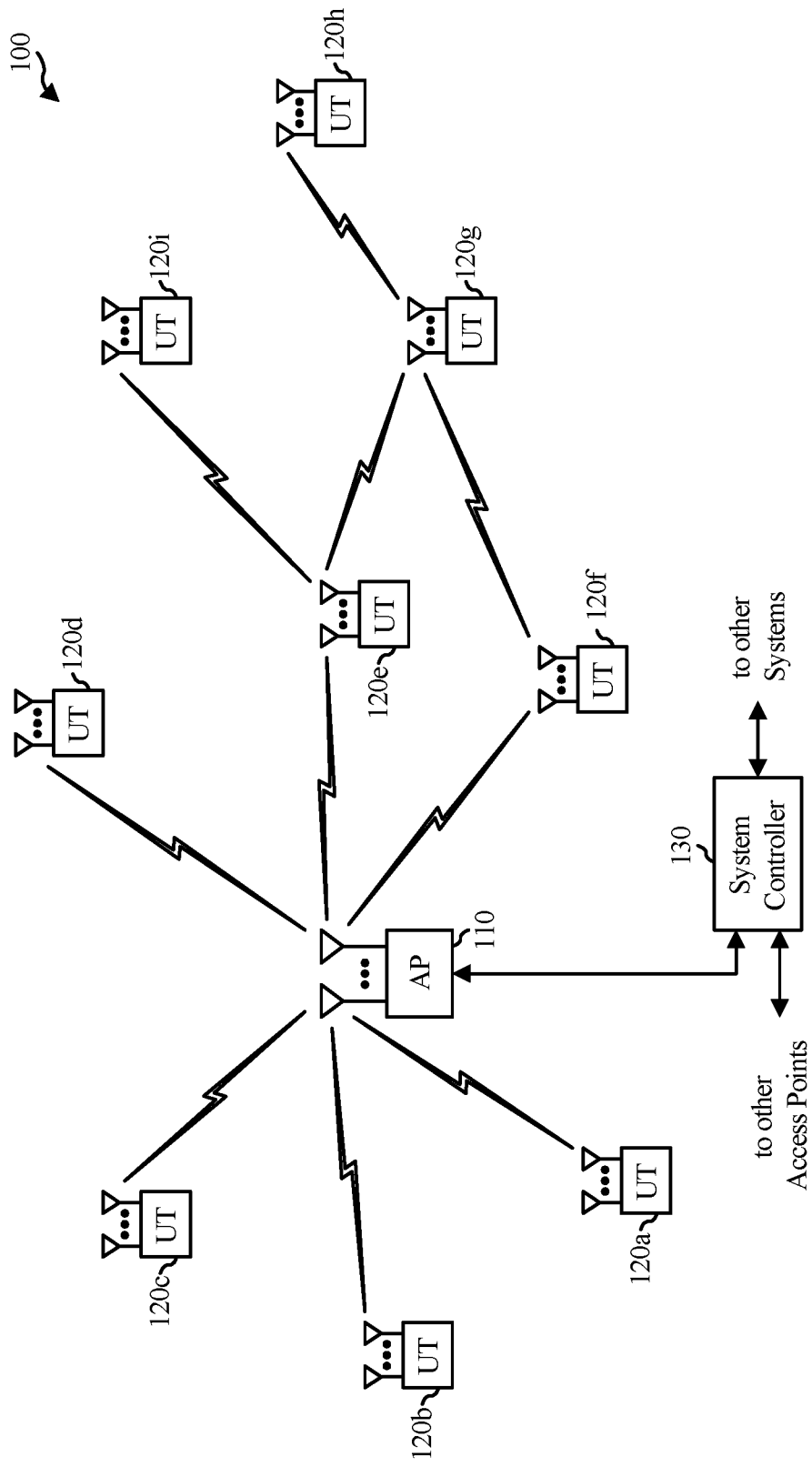
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
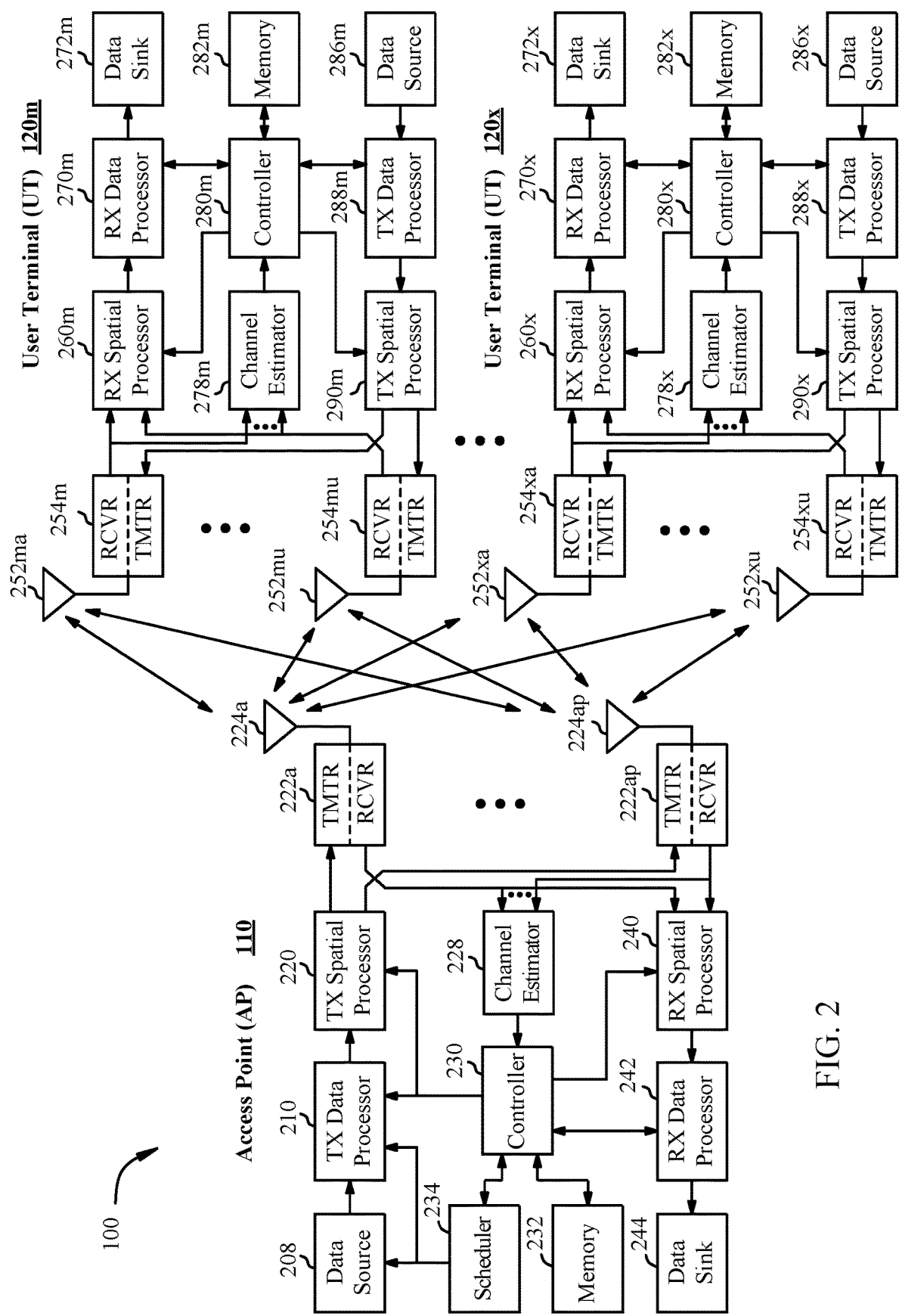
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
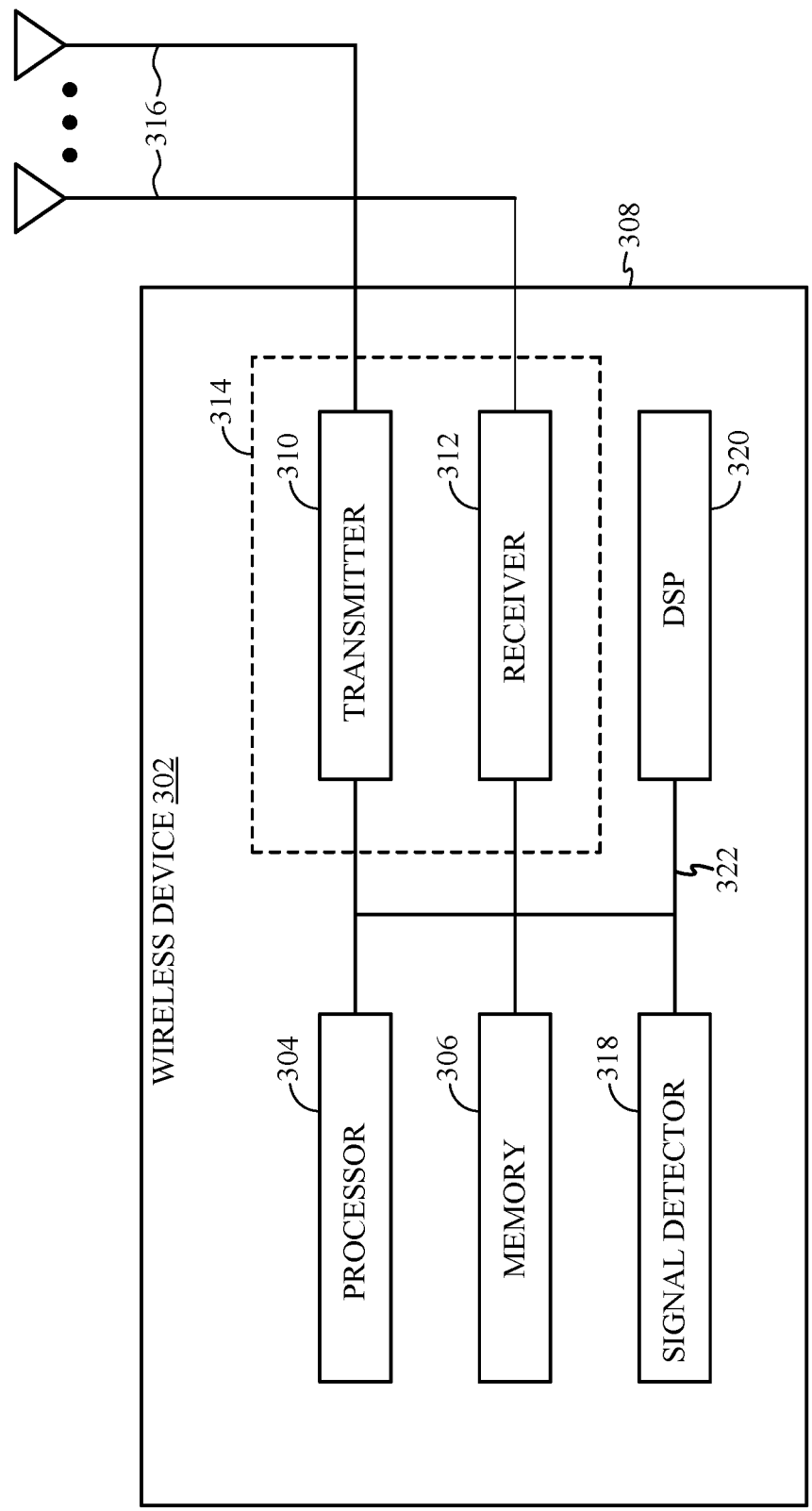
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Protection for Multi-User Transmissions

As described above, aspects of the present disclosure provide various mechanisms for protecting multi-user transmissions. The mechanisms may, for example, be used to set network allocation vector (NAV) durations for uplink (UL) transmissions from stations to an AP or peer-to-peer communications, for example, between stations.

As will be described in greater detail, in some cases, certain stations may be prompted to transmit frames with duration fields set such that stations in range to receive those frames may set their NAV accordingly. In this manner, such aspects may extend protection beyond just those stations in range of the AP. This may help address the so called "hidden node" problem where stations outside the range of an AP may interfere with certain transmissions.

In radio, Multi-user Multiple Input Multiple Output (MU-MIMO) generally refers to MIMO technologies where the available antennas are spread over a multitude of independent access points and independent radio terminals—each having one or multiple antennas. MU-MIMO enables transmissions to be sent concurrently from multiple devices, or a single device to send transmissions to multiple devices concurrently. In contrast, single-user MIMO (SU-MIMO) generally refers to a single multi-antenna transmitter communicating with a single multi-antenna receiver. The performance of MU-MIMO relies on precoding capability of the devices involved.

Frequency Division Multiple Access (FDMA) generally refers to a channel access method used in multiple-access protocols as a channelization protocol. FDMA gives user an individual allocation of one or several frequency bands, or channels. FDMA, like other multiple access systems, coordinates access between multiple users and also may enable transmissions to be sent concurrently from multiple devices, or a single device to send transmissions to multiple devices concurrently.

Uplink (UL) MU-MIMO or UL FDMA can be used to transmit multiple Block ACKs (BAs) at the same time, especially in response to a downlink (DL) MU physical protocol data unit (PPDU). A combination of SU, FDMA, and MIMO can be used for transmission.

A DL (UL) FDMA transmission may consist of, for example, multiple DL (or UL) SU or DL (or UL) MU PPDUs on each (e.g. 20 MHz) channel. Each DL (or UL) MU PPDU may be either a DL (or UL) MU-MIMO PPDU or a DL (or UL) FDMA PPDU. The FDMA PPDU may allocate sub-20 MHz channels.

As described herein, aspects of the present disclosure provide various mechanisms for protection of MU transmissions, such as UL MU MIMO and UL OFDMA. The mechanisms may allow for various NAV setting options for UL MU MIMO or UL OFDMA.

In some cases, all STAs may receive transmissions on a primary channel, same as the primary channel defined in 802.11ac. In some cases, all MU MIMO transmissions may span the same BW. OFDMA transmissions as a whole, may occupy certain defined channels (e.g., multiple of 20 Mhz channels). The schemes described herein may be valid for any BW.

The present disclosure provides mechanisms that may protect MU transmissions, for example, by setting NAV protection for MU transmissions.

As used herein, Network Allocation Vector (NAV) protection generally refers to a virtual carrier sensing mechanism for use with wireless networking protocols Listening wireless devices may receive a transmission including a duration field indicating that the wireless medium is busy for the duration specified. When a device sends an RTS frame, the device includes a duration of time that the station needs to occupy the channel. The listening wireless devices may include a NAV counter or timer. This NAV counter is set in accordance with the received duration. The listening wireless devices refrain from accessing the wireless medium until the NAV counter expires. Wireless devices not accessing the wireless medium during the duration of the NAV counter may enter a power conserving mode. Thus NAV protection reduces reliance on physical carrier sensing on the air interface, allowing for collision avoidance and reduced power requirements. When the NAV timer expires, the device may then sense the air interface to see if it is idle. However, such a system may not be suited for a multi-user environment where multiple devices may be accessing the air interface concurrently. Current standards for MU-MIMO/FDMA may not define NAV protection protocols and does not allow the above operation. Accordingly, protocol rules and signaling to enable the use of NAV protection and MU-MIMO/FDMA are desirable.

Figure 4:
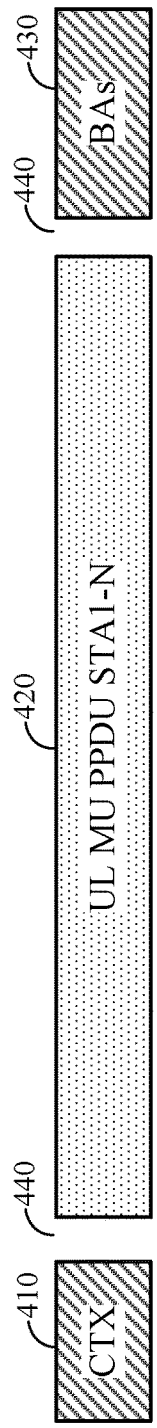

FIG. 4 illustrates one example of MU-transmissions that may be protected utilizing protection mechanisms described herein. As illustrated, an AP may send a frame to trigger transmissions from stations. The frame may be referred to as a clear-to-multiplex (CTX) frame 410. As illustrated, the CTX may trigger multiple (e.g., UL) transmissions 420 from multiple STAs at the same time. As such, the CTX frame may indicate which stations are to participate in the communications as well as when to start transmitting. In some cases, the CTX frame may be transmitted in the primary channel which the stations monitor. In general, the stations may all transmit UL MU PPDUs 420 concurrently according during the allocated transmission time in the protected duration. These UL transmissions may be MU MIMO, UL OFDMA, or another MU format. The STAs may send UL MU frames a short interframe space (SIFS) 440 time after receiving the trigger frame from the AP. The AP may acknowledge the MU transmissions from STAs 1-N using a block acknowledgement (BA) 430. The BA 430 may be a MU transmission to each station acknowledging the UL transmission. As will be described herein, the CTX may be itself triggered by a request-to-multiplex (RTX) frame sent by a STA.

In the figures, downlink frames (transmitted by an AP) are darkly shaded, while uplink frames (transmitted by a STA) are not shaded. A NAV timer setting may be set according to a duration field in a transmitted frame. This duration field may be sent in the header of the frame or in a payload portion of a physical layer convergence protocol (PLCP) protocol data units (PPDU). The duration of the NAV timer is represented in the figures as a horizontal line or arrow below the frame, starting from the end of corresponding frame which sets the NAV timer, for example using a duration field.

Figure 5:
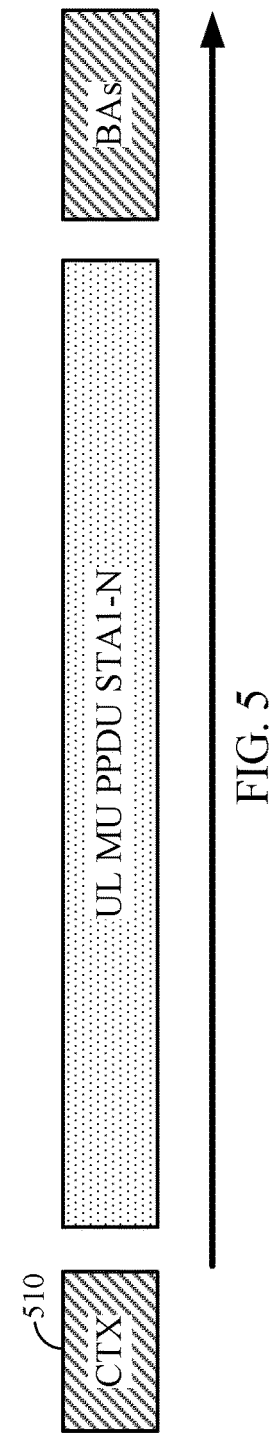

For example, as illustrated in FIG. 5, an AP-initiated MU transmission (triggered by sending a CTX frame) may be protected by the duration field in the CTX frame 510 sent by an AP. Each station receiving the CTX frame 510, including those not addressed by the transmission, sets a NAV timer in accordance with the duration field. As illustrated, the duration field may be set to a value that protects the MU transmission (from STAs 1-N). Further, the duration field may be set to a value that also protects block acknowledgements (BAs) of the MU transmissions. As the NAV timer is set by the AP in the CTX, the protection afforded by the NAV timer is distributed around the AP. Thus a STA may not be protected from hidden node out of detection range of the AP's transmission, but close enough to interfere with the STA's UL.

Figure 6:
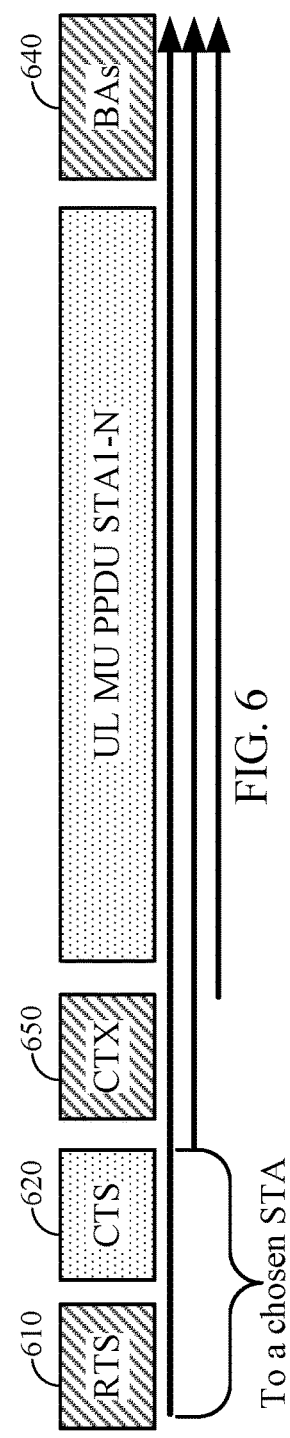

As illustrated in FIG. 6, in some cases, to extend the range of protection, the AP may send a frame (e.g., an request-to-send (RTS)) 610 to trigger a station (e.g., a particular chosen or selected station) to send a clear-to-send (CTS) 620 with a duration field set to protect the MU transmissions (from the selected station and other STAs) as well as the BAs. As illustrated, this RTS-CTS exchange, may precede the CTX 650 sent by the AP. The RTS 610 may set a NAV protecting the reply CTS and provide an indication of a duration to be set by the selected station in the responding CTS 620. The selected station then sends the reply CTS 620 with a duration field appropriately set. This duration field sets up a NAV timer that protects the selected station as the CTS transmission is distributed around the selected station. The AP may then transmit a CTX 650 initiating MU transmissions with another duration field.

Figure 7:
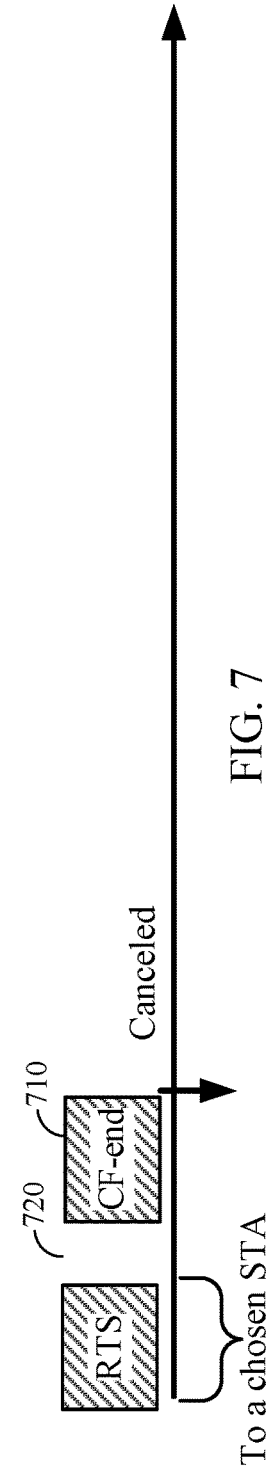

As illustrated in FIG. 7, in the event the selected STA does not respond with a CTS, the AP may cancel the NAV. For example, the AP may send a CF-END frame 710 configured to indicate, to detecting stations, an end of the NAV period, thus freeing up the medium. This frame may be sent, for example, a PCS inter-frame space (PIFS) duration 720 after the end of the expected (but not received) CTS frame.

Figure 8:
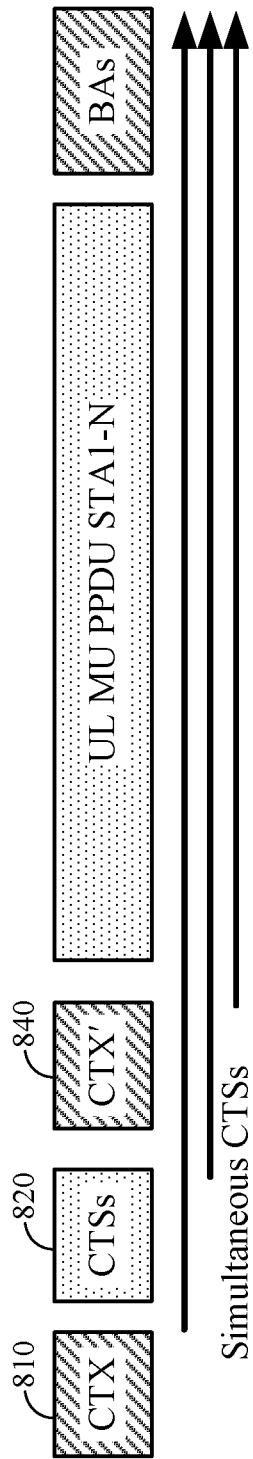

As illustrated in FIG. 8, in some cases, an AP may send a frame (e.g., a first CTX frame) 810 configured to trigger simultaneous CTS frames 820 from the multiple stations. For example, the first CTX frame 810 may include a field that requests multiple particular stations to transmit a CTS frame. The CTS frames 820 may be transmitted on a primary or secondary MU channel in any known format, including legacy formats, which may or may not be the same format as the first CTX frame 810. In some cases, to allow the simultaneous CTS frames 820 to be detected and appear as a single signal, they may be (constructed and) sent using a common seed. The simultaneous CTS frames 820 may each include a duration field for setting up a corresponding NAV timer to protect the stations. The duration of field value may be based on the duration field value from the first CTX frame 810. The AP may then transmit a second CTX 840 initiating MU frame with another duration field.

Figure 9:
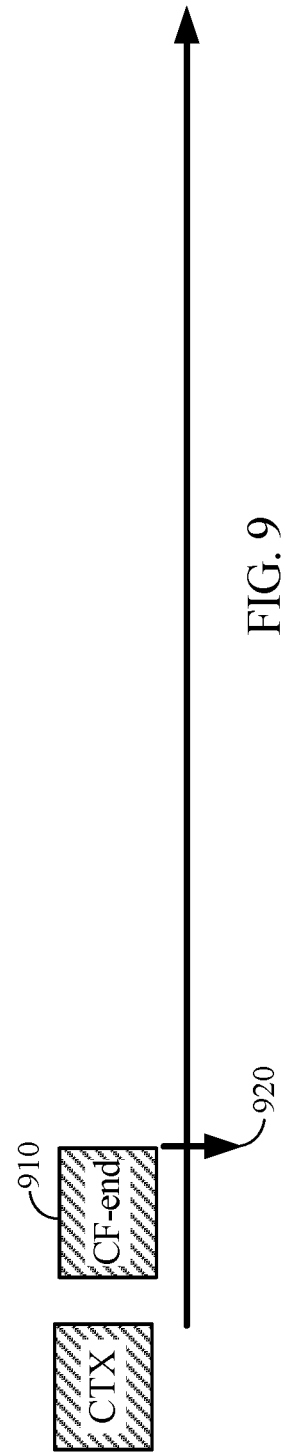

As illustrated in FIG. 9, in the event the STAs do not respond with their CTSs, the AP may cancel the NAV period. As described above, the AP may send a CF-END frame 910 configured to indicate, to detecting stations, an end of the NAV period 920, thus freeing up the medium.

Figure 10:
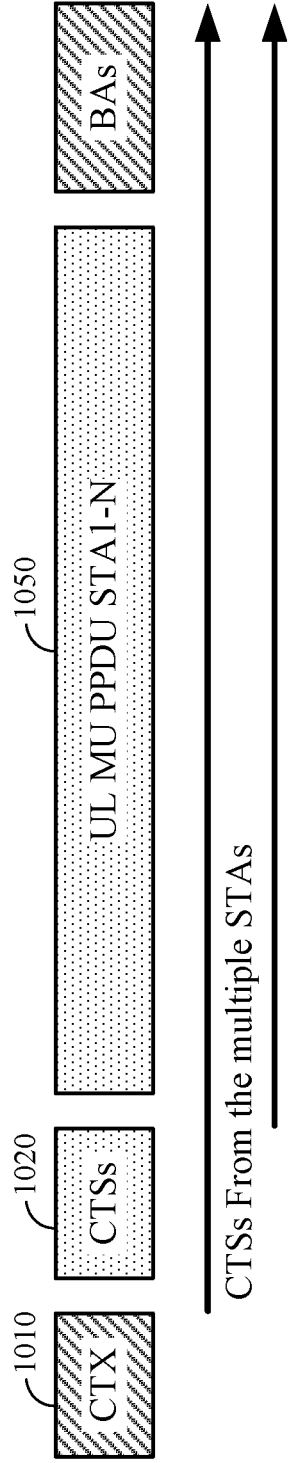

FIG. 10 illustrates another technique for protecting UL Data and DL BA to all STAs. In this example, the AP may initially send a CTX 1010, triggering legacy CTSs 1020 from each of multiple STA. As illustrated, the duration field of the CTX may be set to a value to protect the CTSs, MU transmissions, and the BAs. As illustrated, the CTSs may have a duration field set to a value to protect the MU transmissions and the BAs, thus potentially extending protection beyond the range of the AP. The CTX frame may also include information indicating which stations are to participate in the UL MU communications as well as when to start transmitting. After the CTS are sent, the multiple STAs may transmit UL MU PPDUs 1050 concurrently according during the allocated transmission time in the protected duration set by the CTX 1010.

As illustrated in FIG. 11, in some cases, a CTX 1110 may be initiated by a transmission from a STA. In the illustrated example, a STA (e.g., STA1 or STA2) may trigger the CTX 1110 by sending an RTX frame 1120. As illustrated in FIG. 12, the RTX frames 1210 may have a duration field set to protect at least the CTX 1230. The CTX 1230 may then include a duration field to protect the UL MU PPDUs 1250, as described above.

As illustrated in FIG. 13, the RTX frames 1310 may have a duration field set to protect the CTX and at least a portion of the MU transmissions 1330. The CTX may also include a duration field to protect the UL MU PPDUs 1330, where a NAV set by the RTX frame 1310 is cancelled or expires. As illustrated, the AP may choose to cancel 1340 the NAV, for example, by sending a CTX frame 1350 as a CF-END frame. As illustrated in FIG. 14, in some cases, a STA sending the RTX may also cancel 1410 the NAV, for example, by sending a CF-END frame 1420.

Figure 15:
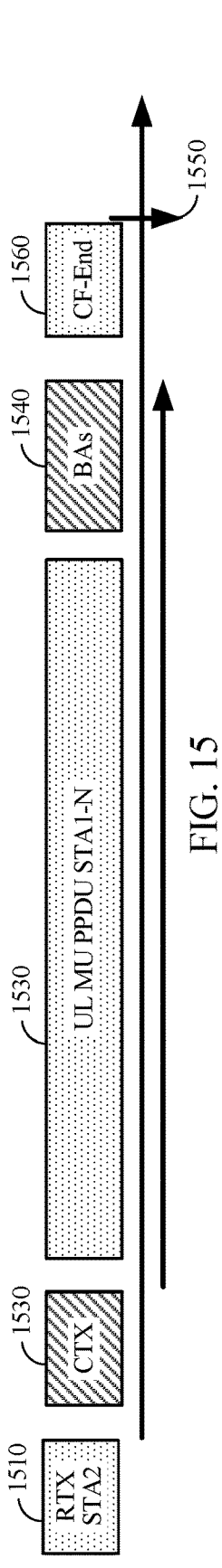

As illustrated in FIG. 15, in some cases, the RTX frame 1510 may have a duration field set to a value even longer than necessary to protect the CTX 1530, MU transmissions 1530, and BAs 1540. In such a case, the same STA may cancel 1550 the NAV, for example, by sending a CF-END frame 1560.

Figure 16:
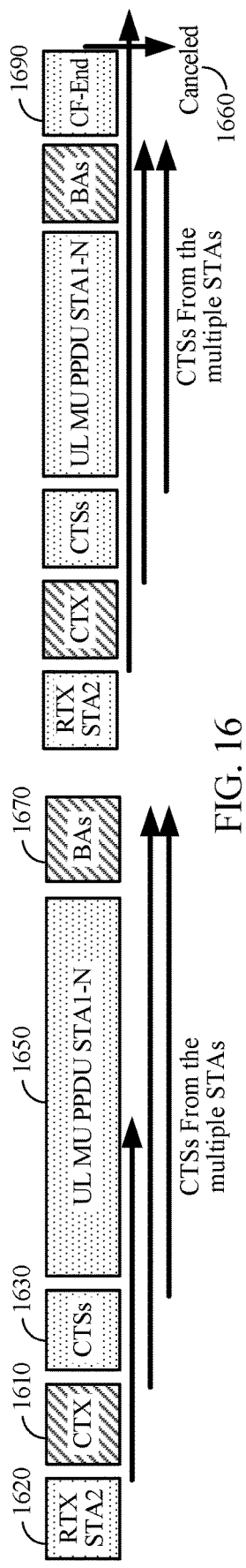
Figure 17:
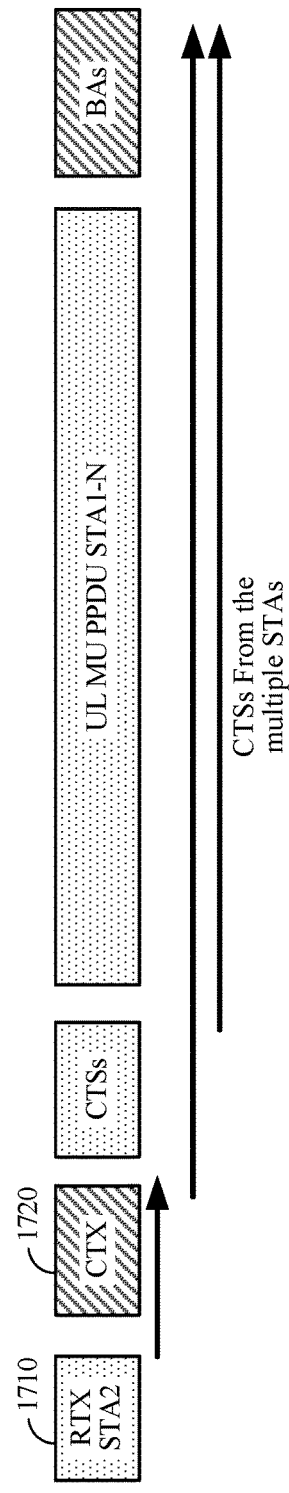

As illustrated in FIG. 16, in some cases, the CTX 1610 (triggered by an RTX 1620) may prompt simultaneous CTSs 1630 from each station. The RTX 1620 may have a duration field set to cover the CTX 1610, simultaneous CTSs 1630, and at least a portion of the MU transmissions 1650. As illustrated, the CTSs 1630 may have a duration field set to cover at least the MU transmissions 1650 and BAs 1670. As illustrated, one of the stations (e.g., STA2 that sent the RTX) may cancel 1660 the NAV of the RTX with a CF-END frame 1690. As illustrated in FIG. 17, the duration field of the RTX 1710 may also be set just to cover the CTX 1720.

Figure 18:
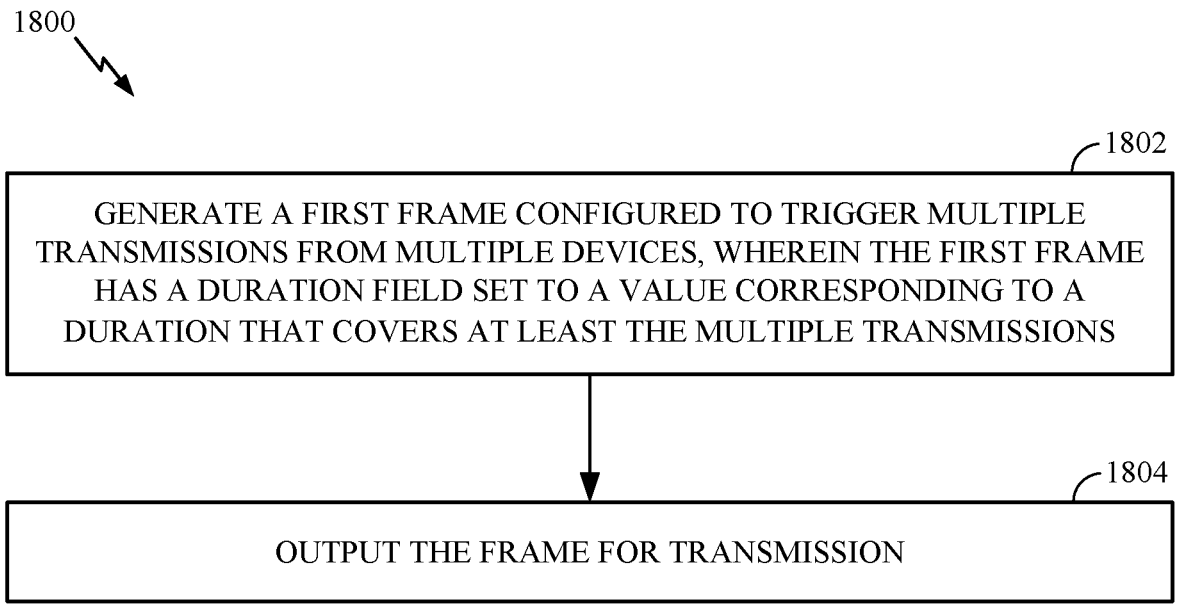
FIG. 18 illustrates example operations for wireless communications, in accordance with certain aspects of the present disclosure.

FIG. 18 illustrates example operations 1800 for wireless communications, in accordance with certain aspects of the present disclosure. The operations 1800 may be performed, for example, by an AP.

The operations 1800 begin, at 1802, by generating a first frame configured to trigger multiple transmissions from multiple devices, wherein the first frame has a duration field set to a value corresponding to a duration that covers at least the multiple transmissions. At 1804, the frame is output for transmission.

As described above, the first frame may be a CTX frame and the duration field may be set to protect the MU transmissions as well as corresponding BAs.

Figure 19:
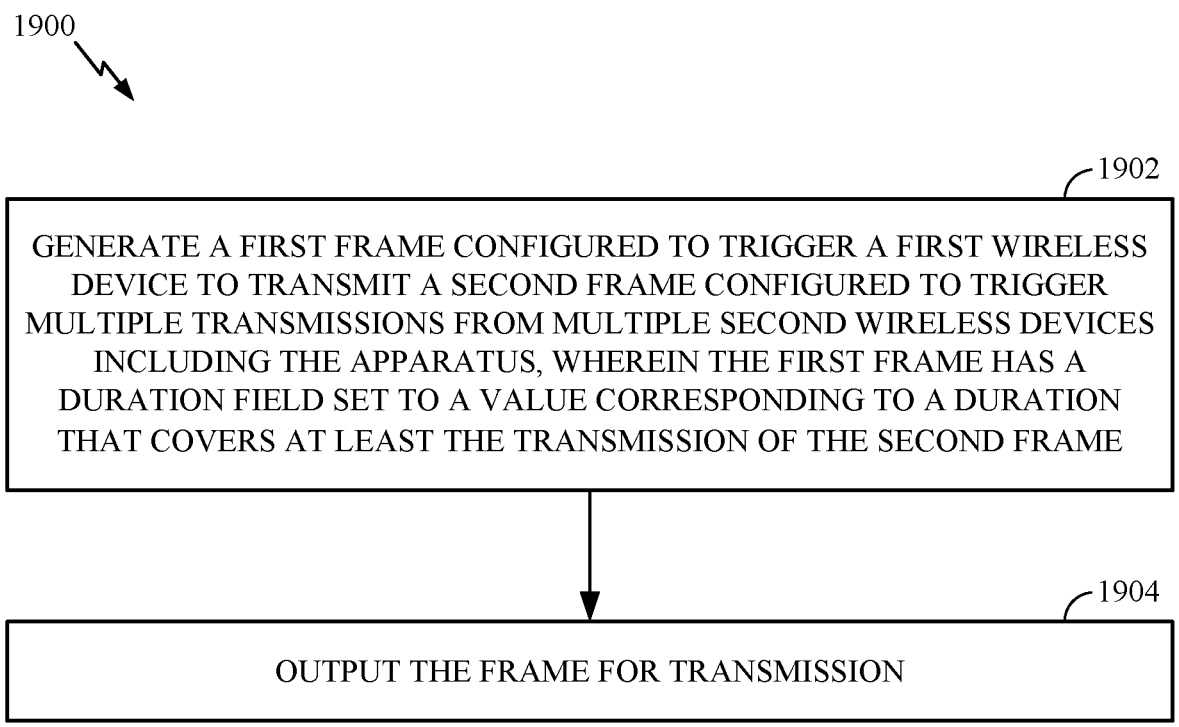
FIG. 19 illustrates example apparatus for wireless communications, in accordance with certain aspects of the present disclosure.
Figure 18A:
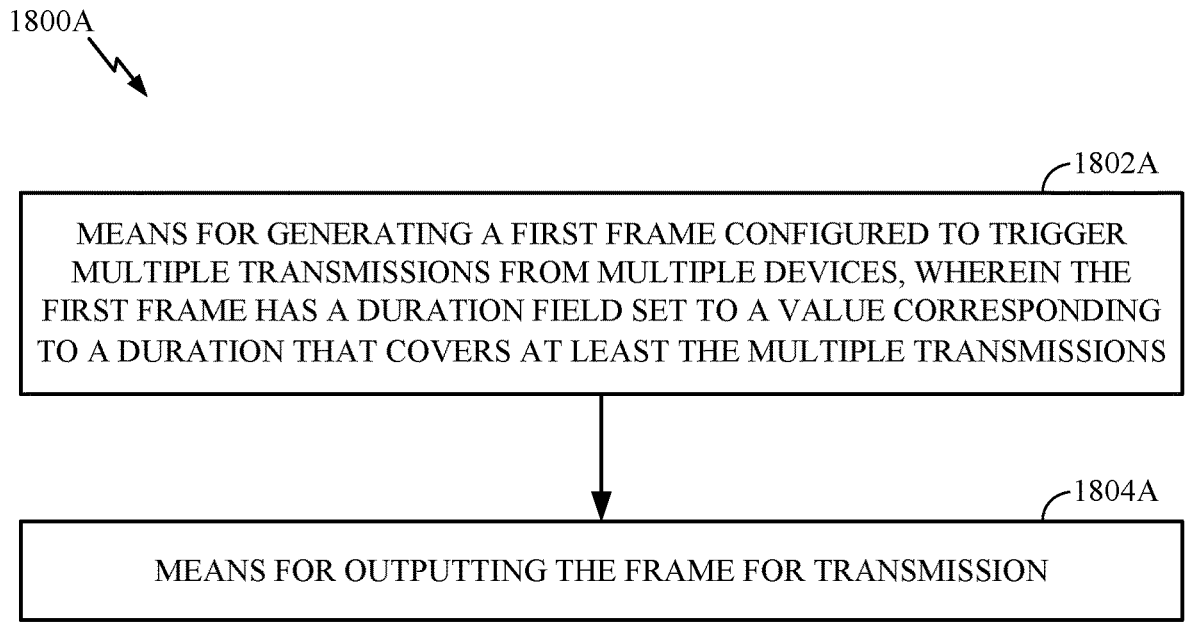
FIG. 18A illustrates example components capable of performing corresponding operations shown in FIG. 18.
Figure 19A:
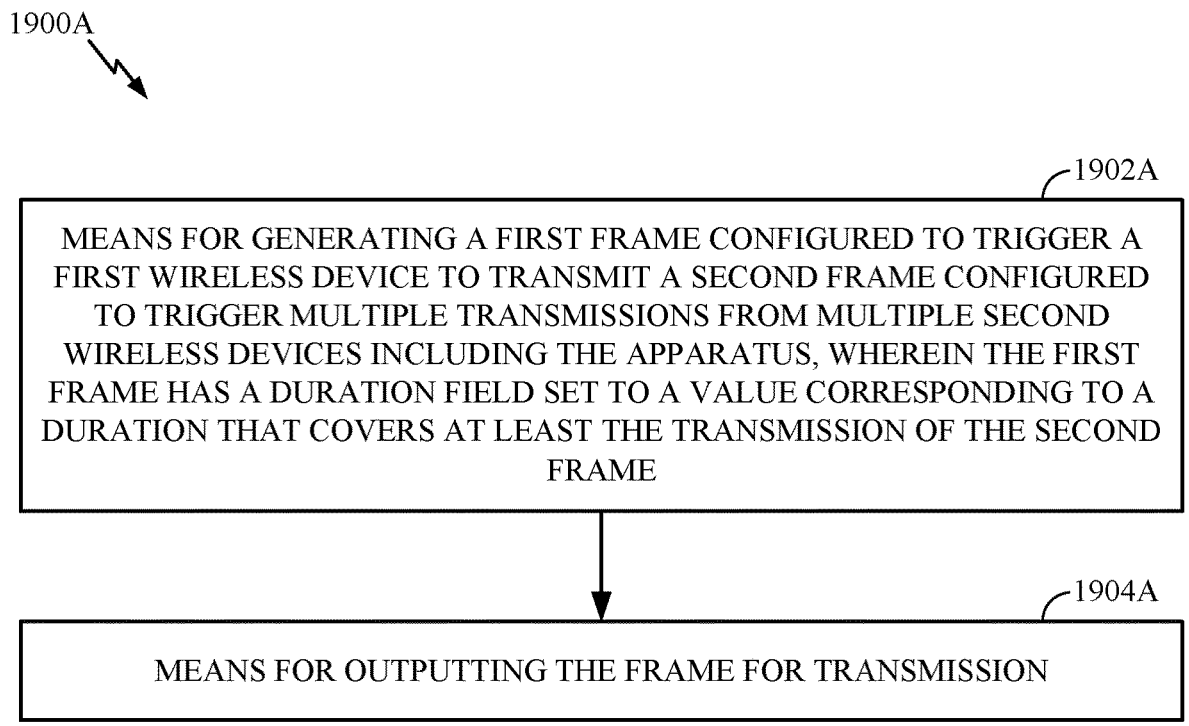
FIG. 19A illustrates example components capable of performing corresponding operations shown in FIG. 19.

FIG. 19 illustrates example operations 1900 for wireless communications, in accordance with certain aspects of the present disclosure. The operations 1900 may be performed, for example, by a station (e.g., one of a plurality of stations participating in MU transmissions with an AP).

The operations 1900 begin, at 1902, by generating a first frame configured to trigger a first wireless device to send a second frame configured to trigger multiple transmissions from multiple second wireless devices including the apparatus, wherein the first frame has a duration field set to a value corresponding to a duration that covers at least the second frame. At 1904, the frame is output for transmission.

As described above, the first frame may be an RTX frame designed to trigger an AP to send a CTX frame and the duration field may be set to protect at least the CTX frame and, possibly, at least a portion of the MU transmissions.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 1800 and 1900 illustrated in FIGS. 18 and 19 may correspond to means 1800A and 1900A shown in FIGS. 18 and 19.

For example, means for outputting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3.

In some cases, an interface for outputting a frame may be an actual transmitter (e.g., physical RF front end) or may be an interface for receiving a frame (e.g., from a processor) and outputting that frame (e.g., to a physical RF front end for transmission).

Means for processing, means for generating, and/or means for determining may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a processing system configured to:
generate a first frame configured to trigger a first wireless device to transmit a second frame configured to trigger transmission of third frames from at least second wireless devices, wherein the first frame has a first duration field set to a first value corresponding to a first duration that covers at least the transmission of the second frame,
generate one of the third frames, in response to the second frame, wherein the generated third frame has a second duration field set to a second value corresponding to a second duration that covers transmission of data frames from at least the second wireless devices, and
generate one of the data frames; and
an interface configured to:
output the first frame for transmission,
output the generated third frame for concurrent transmission with the other third frames from the second wireless devices, and
output the generated data frame for concurrent transmission with the other data frames from the second wireless devices according to the second duration.

2. The apparatus of claim 1, wherein the first duration also covers at least a portion of the transmission of the data frames from the second wireless devices.

3. The apparatus of claim 1, wherein the first duration also covers transmission of block acknowledgements (BAs) corresponding to the data frames.

4. The apparatus of claim 3, wherein the second frame has a third duration field set to a third value that is equal to or longer than the first value corresponding to the first duration.

5. The apparatus of claim 1, wherein:
the processing system is further configured to generate a fourth frame configured to signal an end of a network allocation vector (NAV) period; and
the interface is further configured to output the fourth frame for transmission after the apparatus receives a block acknowledgement (BA) of the generated data frame from the first wireless device.

6. The apparatus of claim 1, wherein the first frame is a request-to-multiplex frame and wherein the generated third frame is a clear-to-send frame.

7. A method for wireless communications, comprising:
generating a first frame configured to trigger a first wireless device to transmit a second frame configured to trigger transmission of third frames from at least second wireless devices, wherein the first frame has a duration field set to a value corresponding to a duration that covers at least the transmission of the second frame;
outputting the first frame for transmission;
generating one of the third frames, in response to the second frame, wherein the generated third frame has a second duration field set to a second value corresponding to a second duration that covers transmission of data frames from at least the second wireless devices;
outputting the generated third frame for concurrent transmission with the other third frames from the second wireless devices;
generating one of the data frames; and
outputting the generated data frame for concurrent transmission with the other data frames from the second wireless devices according to the second duration.

8. The method of claim 7, wherein the first duration also covers at least a portion of the transmission of the data frames from the second wireless devices.

9. The method of claim 7, wherein the first duration also covers transmission of block acknowledgements (BAs) corresponding to the data frames.

10. The method of claim 9, wherein the second frame has a third duration field set to a third value that is equal to or longer than the first value corresponding to the first duration.

11. The method of claim 7, further comprising:
generating a fourth frame configured to signal an end of a network allocation vector (NAV) period;
receiving a block acknowledgement (BA) of the generated data frame from the first wireless device; and
after receiving the BA of the generated data frame, outputting the fourth frame for transmission.

12. The method of claim 7, wherein the first frame is a request-to-multiplex frame and wherein the generated third frame is a clear-to-send frame.

13. An apparatus for wireless communications, comprising:
means for generating a first frame configured to trigger a first wireless device to transmit a second frame configured to trigger transmission of third frames from at least second wireless devices, wherein the first frame has a first duration field set to a first value corresponding to a first duration that covers at least the transmission of the second frame; and
means for outputting the first frame for transmission;
wherein:
the means for generating is further configured to generate one of the third frames, in response to the second frame, wherein the generated third frame has a second duration field set to a second value corresponding to a second duration that covers transmission of data frames from at least the second wireless devices;
the means for outputting is further configured to output the generated third frame for concurrent transmission with the other third frames from the second wireless devices;
the means for generating is further configured to generate one of the data frames; and
the means for outputting is further configured to output the generated data frame for concurrent transmission with the other data frames from the second wireless devices according to the second duration.

14. The apparatus of claim 13, wherein the first duration also covers at least a portion of the transmission of the data frames from the second wireless devices.

15. The apparatus of claim 13, wherein the first duration also covers transmission of block acknowledgements (BAs) corresponding to the data frames.

16. The apparatus of claim 15, wherein the second frame has a third duration field set to a third value that is equal to or longer than the first value corresponding to the first duration.

17. The apparatus of claim 13, wherein:
the means for generating is further configured to generate a fourth frame configured to signal an end of a network allocation vector (NAV) period; and
the means for outputting is further configured to output the fourth frame for transmission after the apparatus receives a block acknowledgement (BA) of the generated data frame from the first wireless device.

18. The apparatus of claim 13, wherein the first frame is a request-to-multiplex frame and wherein the generated third frame is a clear-to-send frame.

19. A wireless station, comprising:
a processing system configured to:
generate a first frame configured to trigger a first wireless device to transmit a second frame configured to trigger transmission of third frames from second wireless devices including the wireless station, wherein the first frame has a first duration field set to a first value corresponding to a first duration that covers at least the transmission of the second frame,
generate one of the third frames, in response to the second frame, wherein the generated third frame has a second duration field set to a second value corresponding to a second duration that covers transmission of data frames from the second wireless devices, and
generate one of the data frames; and
a transmitter configured to:
transmit the first frame,
transmit the generated third frame concurrently with transmission of the other third frames from the second wireless devices, and
transmit the generated data frame concurrently with transmission of the other data frames from the second wireless devices according to the second duration.

20. A non-transitory computer-readable medium having wireless communication instructions stored thereon for:
generating a first frame configured to trigger a first wireless device to transmit a second frame configured to trigger transmission of third frames from at least second wireless devices, wherein the first frame has a first duration field set to a first value corresponding to a first duration that covers at least the transmission of the second frame;
outputting the first frame for transmission;
generating one of the third frames, in response to the second frame, wherein the generated third frame has a second duration field set to a second value corresponding to a second duration that covers transmission of data frames from at least the second wireless devices;
outputting the generated third frame for concurrent transmission with the other third frames from the second wireless devices;
generating at least one of the data frames; and
outputting the generated data frame for concurrent transmission with the other data frames from the second wireless devices according to the second duration.

* * * * *